US008280443B2

(12) United States Patent
Tao et al.

(10) Patent No.: US 8,280,443 B2
(45) Date of Patent: Oct. 2, 2012

(54) WLAN ACCESS POINT WITH EXTENDED COVERAGE AREA

(75) Inventors: Meixia Tao, Hong Kong (CN); Cheong Yui Wong, Hong Kong (CN); Yan Wang, Hong Kong (CN); Kin Nang Lau, Hong Kong (CN); Ross D. Murch, Hong Kong (CN); Soung C. Liew, Hong Kong (CN); Douglas R. George, Hong Kong (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 1943 days.

(21) Appl. No.: 10/903,911

(22) Filed: Jul. 30, 2004

(65) Prior Publication Data
US 2006/0025178 A1 Feb. 2, 2006

(51) Int. Cl.
*H04M 1/00* (2006.01)
(52) U.S. Cl. ................................. 455/562.1
(58) Field of Classification Search .......... 455/562.1, 455/503, 60, 12.1, 13.2, 56.1, 69, 101, 67.1, 455/129, 561, 456.5, 87.1
See application file for complete search history.

(56) References Cited

U.S. PATENT DOCUMENTS

| 6,178,333 | B1 | 1/2001 | Feuerstein et al. | |
|---|---|---|---|---|
| 2003/0176179 | A1 | 9/2003 | Hersey et al. | |
| 2003/0181165 | A1 | 9/2003 | Sugar et al. | |
| 2004/0090938 | A1* | 5/2004 | Hsu | 370/335 |
| 2004/0127220 | A1* | 7/2004 | Proctor, Jr. | 455/442 |
| 2004/0137948 | A1 | 7/2004 | Benning et al. | |
| 2005/0032531 | A1* | 2/2005 | Gong et al. | 455/456.5 |
| 2005/0047384 | A1* | 3/2005 | Wax et al. | 370/338 |
| 2005/0114023 | A1* | 5/2005 | Williamson et al. | 701/214 |
| 2005/0136845 | A1* | 6/2005 | Masuoka et al. | 455/67.14 |

FOREIGN PATENT DOCUMENTS
WO WO 2004/042959 5/2004

OTHER PUBLICATIONS
International Search Report and Written Opinion issued for PCT/CN2005/001007 dated Oct. 20, 2005.

* cited by examiner

*Primary Examiner* — Melody Mehrpour
(74) *Attorney, Agent, or Firm* — Fulbright & Jaworski L.L.P.

(57) ABSTRACT

Disclosed are systems and methods which provide high bandwidth data communication with respect to a large coverage area using smart antenna and/or directional antenna (referred to herein as multi-beam antenna) technology. Circuitry may be provided at a WLAN AP to provide selection of particular antenna beams used in the downlink and/or uplink, control of multicast transmission, control of unicast transmission, and to provide antenna pattern shaping techniques. Embodiments implement multi-beam antenna technology with little or no hardware modifications to AP circuitry. Other embodiments implement multi-beam technology using radio front-end and/or radio hardware modifications to AP circuitry. Various diversity techniques may be implemented, such as selection diversity, maximum ratio combining, and equal gain combing. To provide desired antenna pattern shaping, phase offsets with respect to a signal as transmitted in each antenna beam may be employed.

66 Claims, 9 Drawing Sheets

WLAN ACCESS POINT WITH EXTENDED COVERAGE AREA

CROSS-REFERENCE TO RELATED APPLICATIONS

The present application is related to co-pending and commonly assigned U.S. patent application Ser. No. 10/833,626 entitle "Systems and Methods for Wireless Network Range Extension," filed Apr. 28, 2004, the disclosure of which is incorporated herein by reference.

TECHNICAL FIELD

The present invention is related generally to wireless communications and, more particularly, to providing wireless communications with extended range.

BACKGROUND OF THE INVENTION

Wireless communication systems typically have a base station or access point from which radio signals are transmitted and propagate. These signals are then received by a mobile station, remote station, user station, client station, subscriber station, etcetera (referred to herein collectively as stations) allowing communication to proceed. Stations may be, for example, a computer with a wireless modem such as a notebook computer fitted with a wireless local area network (WLAN) card (referred to herein as a wireless notebook), mobile telephone or a wireless personal digital assistant.

Wireless communication systems typically provide two-way or duplex communication so that an access point can exchange data with or "talk" to a station, such as a wireless notebook, and the station can exchange data with or "talk" to the access point. In effect, there are two separate radio links by which these two signals travel, known respectively as the down-link and up-link.

Radio frequency (RF) signals can only propagate a certain distance through a medium, such as air, before their power level is appreciably attenuated. For example, there is a distance from a transmission source (e.g., transmitting antenna) at which the RF signal level falls below a certain threshold and cannot be usefully received. The area around a network access point in which signals can be usefully received is known as the coverage area and is sometimes referred to as a cell. When a station moves outside the coverage area, signals cannot be usefully received and communication is generally not possible. Accordingly it is often desirable to implement wireless systems that create as large a network coverage area as possible at minimum cost in order to provide communication services to as large an areas, and thus as many stations, as possible.

Recently, wireless communications have been combined with local area network (LAN) systems to provide wireless LAN (WLAN) configurations in which stations may be freely distributed throughout a workspace, e.g., an office building, and provided with high bandwidth data communications (such as on the order of 10 to 54 mega-bits per second (Mbps)) without a network cable attached to the stations. Accordingly, WLAN infrastructure has been designed for indoor pedestrian (ambulatory mobility) access over relatively short distances (e.g., on the order of 1-30 meters).

It is a challenging problem to extend the coverage area of a WLAN system to provide high bandwidth coverage in outdoor public areas or other large coverage areas. For example, hidden node problems (e.g., where a first station is within the communication area of an AP and can communicate with the AP, a second station is also within the communication area of an AP and can communicate with the AP, but the first and second station are disposed such that they cannot detect each other's communications) may be increased. Likewise, interference, whether intra-cell, inter-cell, and external, may be aggravated through extending a WLAN coverage area.

Accordingly, there is a need for a system and method for providing relatively high bandwidth data communication in a large coverage area, such as a macrocell having a radius on the order of 500 meters or more. There is a further need for a system and method for extending a coverage area of WLAN infrastructure to provide WLAN data communication in a large coverage area.

BRIEF SUMMARY OF THE INVENTION

The present invention is directed to systems and methods which provide high bandwidth data communication with respect to a large coverage area using smart antenna and/or directional antenna (referred to herein as multi-beam antenna) technology. Preferred embodiments operate to communicate control or overhead data packets throughout the coverage area. However, embodiments of the invention operate to communicate payload data packets in one or more beam determined to be optimal with respect to a station associated with the payload data.

The range of WLAN infrastructure is extended through the use of multi-beam antenna technology according to embodiments of the present invention. In operation, all stations disposed within the coverage area of a WLAN AP adapted according to the present invention operate in a substantially conventional manner, and therefore may remain unaltered from a standard configuration although communicating within an extended coverage area provided according to an embodiment of the present invention. Circuitry of the present invention is preferably provided at the WLAN AP to provide selection of particular antenna beams used in the downlink and/or uplink, control of multicast transmission, control of unicast transmission, to provide antenna pattern shaping techniques, etcetera.

Embodiments of the invention implement the foregoing multi-beam antenna technology with little or no hardware modifications to AP circuitry, except that directly associated with the antenna and associated signal feed matrix. Such embodiments may implement software modifications and/or hardware modifications to access point (AP) circuitry in order to implement optimal beam determinations, to implement time division protocols, and/or the like. The foregoing optimal beam determinations and time division protocols may result in introducing additional overhead into the communication protocols, thereby consuming capacity otherwise available for payload data communication. However, as communication protocols, such as those set forth in the IEEE 802.11 standards, useful with embodiments of the present invention provide for decreased bit rates as link quality decreases, use of multi-beam antenna technology according to such embodiments is expected to provide improved link quality and, therefore, may provide a net increase in payload data capacity.

Alternative embodiments of the invention implement the foregoing multi-beam technology using radio front-end and/or radio hardware modifications to AP circuitry. Such embodiments may implement hardware modifications without introducing additional overhead into the communication protocols, and thus consuming no capacity otherwise available for payload data communication. Moreover, as communication protocols useful with embodiments of the invention provide for decreased bit rates as link quality decreases, use of multi-beam antenna technology according to such embodiments is expected to provide improved link quality and, therefore, provide an increase in payload data capacity.

Various diversity techniques may be implemented according to embodiments of the invention, such as selection diversity, maximum ratio combining, and equal gain combing, using multi-beam antenna technology. However, embodiments of the invention implement selection diversity in order to simplify the circuitry employed therein while providing significant advantages of diversity techniques.

In providing extended coverage area communication, embodiments of the present invention implement multicast transmission techniques wherein information, such as control or overhead data, is simultaneously transmitted on multiple beams of a multi-beam antenna system. To provide desired antenna pattern shaping (e.g., avoid or mitigate undesired nulls), embodiments of the present invention employ phase offsets with respect to a signal as transmitted in each antenna beam. For example, random phase offsets may be utilized with respect to each antenna beam a signal is transmitted during a multicast. Such phase offsets may be utilized to provide a desired time averaged antenna pattern.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Embodiments of the present invention provide high bandwidth data communication within a large coverage area using multi-beam antenna technology. For example, a larger or extended WLAN coverage area may be provided according to the present invention using a controllable multi-beam configuration. In operation according to such an embodiment, a station disposed anywhere within the coverage area of the WLAN infrastructure operable according to embodiments of the present invention may operate in a substantially conventional manner to communicate with an access point (AP), thereby being provided high data rate links. High bit rate data, such as may carry payload data, may then be transmitted through one or more directional antenna beams of the multi-beam antenna system targeted at the appropriate stations. Multicast transmissions, simultaneously using a plurality of the antenna beams of the multi-beam antenna system to transmit a signal, may be used to provide control or overhead data. Such multicast transmissions may be provided at a low data rate to facilitate useful communication to all stations disposed within the coverage area.

Although exemplary embodiments are described herein with reference to WLAN networks, the concepts of the present invention are not limited in application to such networks. It will be appreciated by those of skill in the art that the concepts of the present invention may be applied to a variety of wireless communication links, whether conforming to protocols generally associated with WLAN networks or otherwise and whether including a node which is referred to as an access point or not. For example, embodiments of the present invention may be utilized with respect to a personal handyphone system (PHS).

Figure 1:
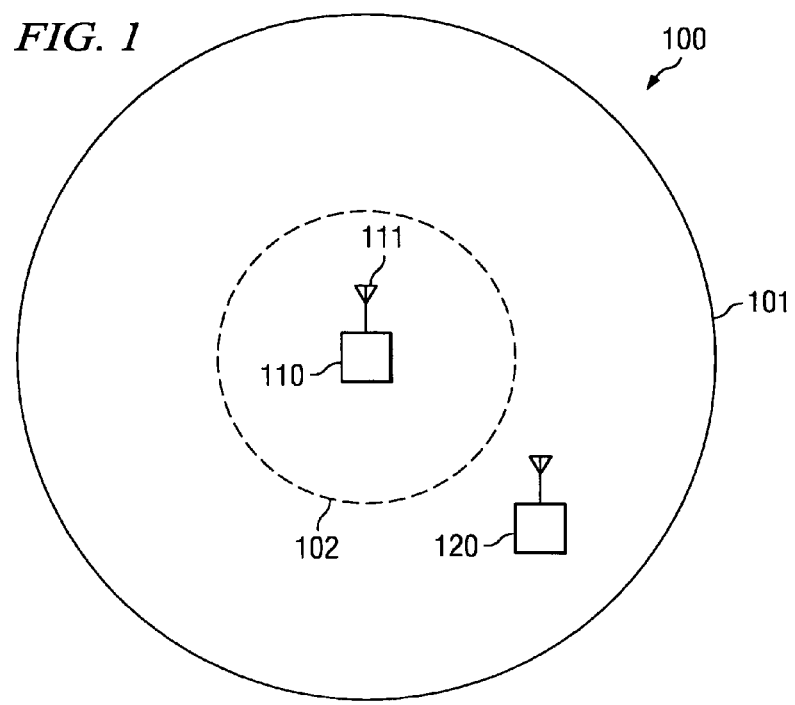
FIG. 1 shows a wireless network system adapted according to embodiments of the present invention.

Directing attention to FIG. 1, a wireless communication coverage area associated with an access point or base station of a wireless network is shown. Specifically, FIG. 1 shows wireless network system 100 wherein access point or base station 110 has been adapted to provide wireless communication within coverage area 101 in which wireless communications between remote, possibly mobile, stations, such as station 120, may be established with base station 110. It should be appreciated that coverage area 101 is an extended coverage area as provided according to concepts of the present invention using multi-beam technology. For example, the circuitry and/or protocols typically implemented by an access point or base station such as base station 110 may provide a significantly smaller coverage area, such as coverage area 102, but directional antenna beams of multi-beam antenna 111 utilized in the illustrated embodiment illuminate coverage area 101.

Wireless communication between base station 110 and stations such as station 120 is preferably bi-directional. For example, bi-directional communication links may be established between base station 110 and station 120 using IEEE 802.11 protocols, according to embodiments of the invention. However, such links may be accomplished according to a number of protocols according to alternative embodiments of the invention.

Although not shown in FIG. 1 in order to simplify the drawing, system 100 may comprise any number of base stations and/or stations deemed appropriate to a particular situation. Base stations of such a system may be interconnected and/or connected to backbone communications, such as a local area network (LAN), a metropolitan area network (MAN), a wide area network (WAN), the Internet, the public switched telephone network (PSTN), a satellite communication system, a cable network, and/or the like. Similarly, remote stations such as station 120 may comprise one or more systems, such as a network of computers (e.g., LAN, MAN, WAN, etcetera), or stand-alone terminals, such as a personal computer (PC), personal digital assistant (PDA), notebook computer, cellular telephone, etcetera, having a wireless interface operable as described herein.

According to embodiments of the invention, coverage area 101 is a relatively large area, such as may extend a distance on the order of 500 meters or more from base station 110 in all directions, as may correspond to the coverage area of a cellular telephone communication system base transceiver station (BTS) coverage area (commonly referred to as a cell). Alternatively, coverage area 101 may extend from base station 110 to provide less than omni-directional coverage, although perhaps still covering a relatively large area and perhaps extending a distance on the order of 500 meters or more from base station 110 in a particular direction or directions. For example, coverage area 101 may provide a sector coverage area, such as a 90° or 120° sector, if desired.

Figure 2A:
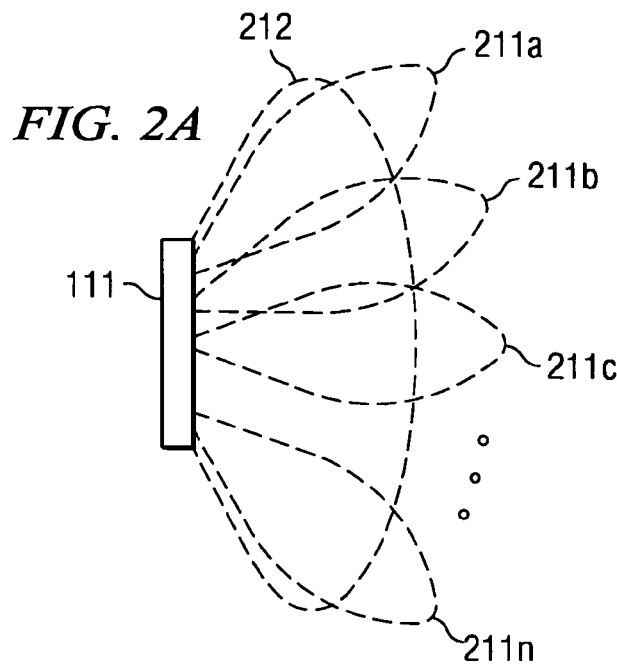
FIGS. 2A and 2B show multi-beam antenna patterns as may be utilized according to embodiments of the present invention.

Directing attention to FIG. 2A, an embodiment wherein multi-beam antenna 111 provides a sector coverage area is shown. Specifically, multi-beam antenna 111 provides high gain directional antenna beams 211a-211n (n representing any number) and antenna beam 212 providing a coverage area substantially corresponding to the composite coverage area of antenna beams 211a-211n (shown here as an approximately 120° sector coverage area). In contrast, the embodiment of FIG. 2B multi-beam antenna 111 provides an omni-directional coverage area through use of high gain directional antenna beams 221a-221n (n representing any number) and antenna beam 222 providing a coverage area substantially corresponding to the composite coverage area of antenna beams 221a-221n (shown here as an omni-directional coverage area). Although the embodiments of FIGS. 2A and 2B each show a same number of antenna beams, it should be appreciated that the concepts of the present invention are not limited to any particular number of antenna beams, antenna beam configurations, or antenna beam radiation patterns.

Multi-beam antenna 111 may comprise a variety of antenna technology. For example, multi-beam antenna 111 may comprise a panel antenna, having columns of antenna elements, used with a beam former, such as a Butler matrix well known in the art, to provide a plurality of fixed directional beams. Alternatively, multi-beam antenna 111 may comprise a phased array, having columns of antenna elements, used with an adaptive beam former, such as a digital beam former well known in the art, to provide a plurality of adaptive directional beams. Embodiments of multi-beam antenna 111 may comprise multiple ones of the forgoing antenna panels to provide a desired number of antenna beams and/or antenna beams oriented in desired directions (whether azimuth and/or elevation). Although panel antenna configurations have been mentioned above, embodiments of the present invention may use any number of antenna geometries, including conical, curvilinear, and the like. Moreover, embodiments of the invention may use separate or individual antennas to provide the multiple directional antenna beams, if desired.

An extended coverage area, such as coverage area 101, using multi-beams according to the present invention may be provided according to various embodiments. To better aid in understanding the concepts of the present invention, 3 such embodiments shall be particularly described herein. However, it should be appreciated that application of the concepts of the present invention are not limited to the embodiments described in detail.

Figure 3:
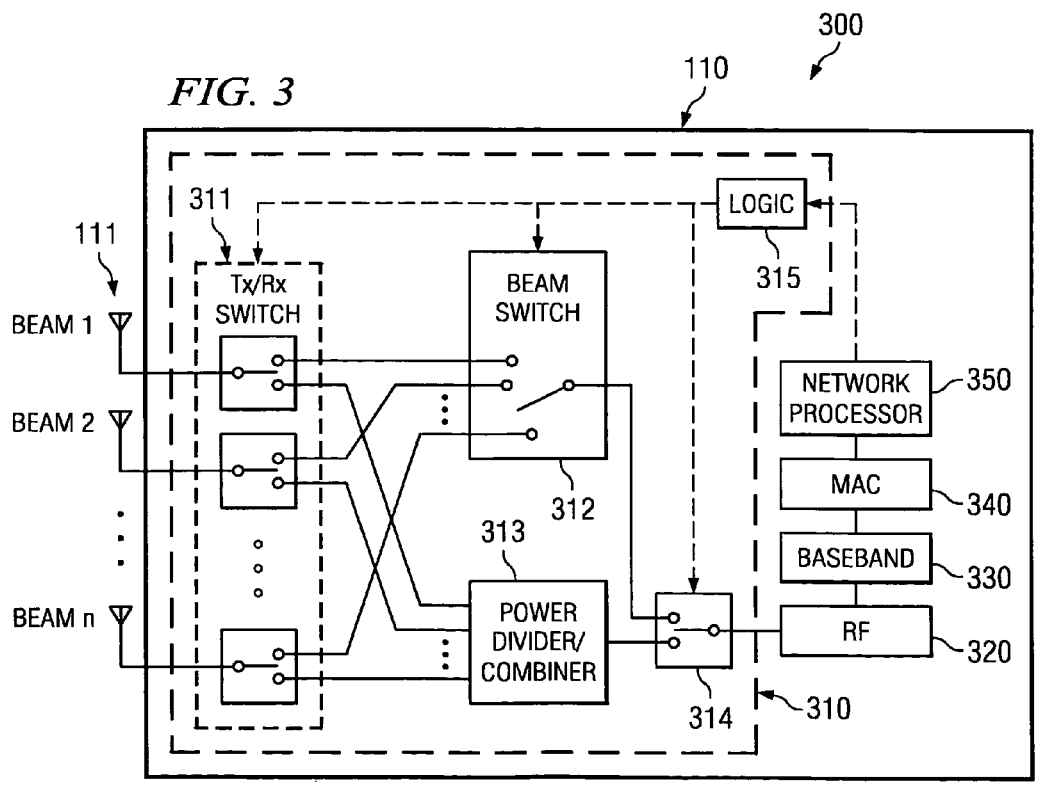
FIG. 3 shows a block diagram of a wireless network base station adapted according to an embodiment of the present invention.

Directing attention to FIG. 3, an embodiment employing a scheduling algorithm to control the timing of packet transmission and receiving using multi-beam antenna technology according to the present invention is shown as system 300. The illustrated embodiment of FIG. 3 utilizes RF circuitry 320, baseband circuitry 330, media access control (MAC) circuitry 340, and network processor 350 of a conventional access point architecture (although operating under control of algorithms adapted according to the present invention), such as that of an IEEE 802.11 compliant access point. However, antenna beam selection circuitry 310 of the present invention, comprising multiplexer circuitry 311, beam switch 312, power divider/combiner 313, mode selector 314, and control logic 315, is coupled to the foregoing access point circuitry to provide an interface to multi-beam antenna 111 operable according to concepts of the present invention.

Control logic 315 of embodiments operates under control of the aforementioned scheduling algorithm to communicate control or overhead data packets throughout the coverage area using each of beams 1-n and to communicate payload data packets in one or more beam determined to be optimal with respect to a station associated with the payload data. Accordingly, control logic 315 may comprise a central processing unit (CPU), associated memory, and appropriate input/output interfaces, operable under control of an instruction set defining operation as described herein. Additionally or alternatively, control logic 315 may comprise application specific integrated circuits (ASICs) providing operation as described herein.

Network processor 350 may be adapted to provide information or other signaling to control logic 315 for facilitating operation according to embodiments of the present invention. For example, network processor 350 may provide information with respect to a type of data packet being transmitted/received, a particular station data being transmitted/received is associated with, etcetera, in order to facilitate control logic 315 providing control of various components to provide operation of base station 110 as described herein. Additionally or alternatively, control software of network processor 350 may be adapted to include instructions defining operation as described herein, in addition to or in the alternative to the above mentioned instruction set utilized with respect to control logic 315. For example, software of network processor 350 may be altered to provide appropriate control signals, perhaps via control logic 315, to one or more of multiplexer circuitry 311, beam switch 312, mode selector 314, and control logic.

The multiple antenna beams provided by multi-beam antenna 111 (beams 1-n) are operable in a plurality of modes according to the embodiment of FIG. 3. In a first mode, the antenna beams behave like one global antenna through the power divider/combiner to provide a wide coverage area, e.g., antenna beam 212 of FIG. 2A providing approximately 120° sector coverage area or antenna beam 222 of FIG. 2B providing an omni-directional coverage area. This first mode is referred to herein as a "global-mode," and may be provided when mode selector 314 couples antenna 111 to RF circuitry 320 through power divider/combiner 313. For example, during transmission in global-mode according to one embodiment, a signal output by RF circuitry 320 is provided by mode selector 314 to power divider/combiner 313 where the signal is power divided (preferably equally power divided) for radiating in each of beams 1-n via multiplexer circuitry 311. Receiving in a global-mode according to one embodiment may be provided essentially as described above with respect to transmission, although the signal paths are reversed.

Figure 2B:
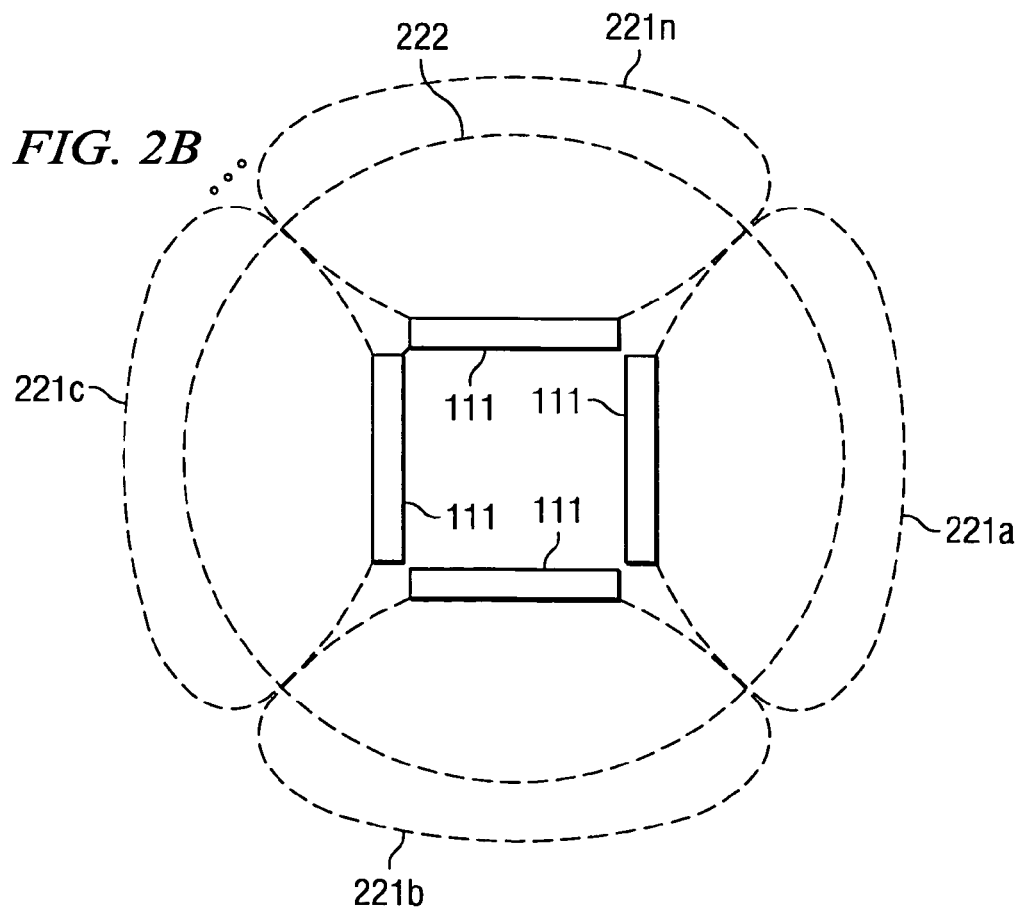

In a second mode, the antenna beams are utilized individually or in subsets of antenna beams through the beam switch to provide a localized coverage area, e.g., one of antenna beams 211a, 211b, 211c, or 211n of FIG. 2A providing approximately 30° coverage area or one of antenna beams 221a, 221b, 221c, or 221n of FIG. 2B providing approximately 90° coverage area. This second mode is referred to herein as an "individual-mode," and may be provided when mode selector 314 couples antenna 111 to RF circuitry 320 through beam switch 312. For example, during transmission in individual-mode according to one embodiment, a signal output by RF circuitry 320 is provided by mode selector 314 to power beam switch 312 where the signal is directed to a selected one or subset of antenna beams 1-n via multiplexer circuitry 311. Receiving in an individual-mode according to one embodiment may be provided essentially as described above with respect to transmission, although the signal paths are reversed. The beams utilized in individual-mode according to embodiments provide extra antenna gain, although in relatively narrow area.

Mode selection, such as between the aforementioned global-mode and individual-mode by multiplexer circuitry 311 and mode selector 314, is preferably controlled by software in network processor 350 and/or control logic 315, according to embodiments of the invention. Likewise, beam switching, such as to select a particular beam of beams 1-n in individual-mode by beam switch 312, is preferably controlled by software in network processor 350 and/or control logic 315.

In operation according to a preferred embodiment, broadcast frames, such as Beacon and control frames (e.g., request to send (RTS), clear to send (CTS), etcetera), are transmitted by system 300 using the global-mode. Such global-mode communications are preferably provided at a low data rate, e.g., the lowest possible data rate, with high transmission power. Global-mode communications may additionally or alternatively be used with respect to uplink communications, such as to periodically monitor coverage area 101 for new/relocated stations and/or provide other control signaling. Using global-mode communications, particularly in combination with the preferred embodiment low data rate/high power transmission techniques, embodiments of the invention can optimize the opportunity for each station within coverage area 101 to receive such transmissions, and thus be apprised of system status and other control and operations information.

The individual-mode of a preferred embodiment provides for transmission of payload data frames and acknowledgments (ACKs) to/from system 300. Such individual-mode communications are preferably provided at a high data rate, e.g., the highest possible data rate. Using individual-mode communications, particularly in combination with the preferred embodiment high data rate transmission techniques, embodiments of the invention can optimize the amount of data carried by system 300, maximize channel quality metrics (e.g., signal to noise, interference, etcetera) while minimizing interference caused to other systems (e.g., base stations and remote stations not associated with the particular data transmission). In particular, the use of the directional antenna beams provides extra gain with respect to stations, especially those stations disposed farther from base station 110, such that the stations can connect with a higher bit rate.

In operation as described above, during individual-mode communications the currently selected directional antenna beam of multi-beam antenna 111 points to a selected station (or stations), and stations disposed in other directions may not be illuminated by the selected antenna beam. Accordingly, embodiments of the present invention operate to select antenna beams steered toward different directions to satisfy all the stations. According to preferred embodiments, stations send or receive frames (or other data) only when a directional antenna beam illuminating an area in which the station is disposed is selected (or otherwise operational for communication), thereby avoiding transmissions which are unlikely to be received by an associated base station but which may cause interference with other stations. For example, an embodiment of the invention may transmit a CTS packet using a global-mode antenna beam to cause stations to suspend transmissions. Thereafter, an individual-mode antenna beam may be selected which illuminates a number of stations. It may be desirable to initiate information communication with many or all such stations illuminated by the individual-mode antenna beam. Accordingly, a polling message or other suitable message, such as a beacon message, or a contention-free end message, may be transmitted by the base station using the individual-mode antenna beam to facilitate information communication with respect to any or all of the stations illuminated thereby.

An efficient way to provide control with respect to stations transmitting/receiving only when a selected directional antenna beam is illuminating the station is to schedule the station to send or receive at a pre-defined interval. Such scheduling may be implemented by knowing which beam pattern is the best for a particular station (e.g., the antenna beam providing the highest receive signal strength, the best signal to noise ratio, the lowest interference, the lowest bit error rate, etcetera) and providing information to the station as to when the station is allowed to send or receive (e.g., when the appropriate antenna beam will be operational for communication, when communication using the appropriate antenna beam will be for the particular station, etcetera).

Embodiments of the invention implement a beam switching table or tables to keep beam selection information with respect to each station provided communications by base station 110. For example, information stored in a beam switching table may comprise information with respect to the most favorable antenna beam for each use with respect to each station. A most favorable antenna beam for use with respect to a particular station may be determined by comparing the statistics of received signal strength indicator (RSSI) and error status of all beams.

Figure 4:
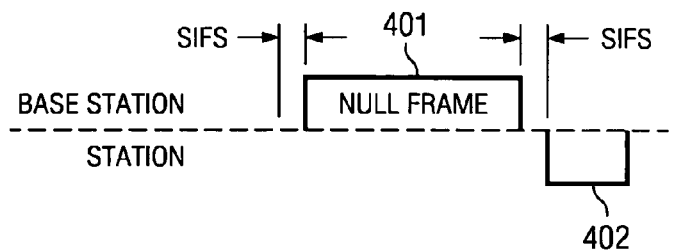
FIG. 4 shows a technique for searching for a most favorable antenna beam for a station according to an embodiment of the present invention.

A technique for searching for the most favorable ("best") antenna beam for a station is illustrated in FIG. 4. In the embodiment of FIG. 4, base station 110 transmits null frames using each antenna beam and waiting for an associated response (e.g., ACK frame). For example, base station 110 may operate to select a first antenna beam, such as antenna beam 211a (FIG. 2A), using beam switch 312 (FIG. 3) and transmit null frame 401. Null frame 401 may be directed (e.g., addressed) to a particular station, such as station 120 (FIG. 1).

Alternatively, null frame 401 may be a broadcast frame, according to embodiments of the invention. Irrespective of the station or stations to which null frame 401 is directed, base station 110 preferably waits a predetermined period of time after transmission for response 402 from a station or stations. If antenna beam 211a is one through which some level of communication is possible between base station 110 and a station such as station 120 (e.g., whether through direct or indirect illumination), response 402 will be returned according to preferred embodiment communication protocols. However, if antenna beam 211a is one through which communication is not possible between base station 110 and a station such as station 120, there should be no response 402 received by base station 110. After transmission of null frame 401 and awaiting a predetermined period of time for receipt of response 402, base station 110 of embodiments operates to select a next antenna beam, such as antenna beam 211b (FIG. 2A), using beam switch 312 (FIG. 3), repeating the above described null frame transmission and awaiting reception of a response frame. These steps may be performed with respect to each antenna beam and each station according to embodiments of the invention in order to select a most favorable antenna beam for use in communications associated with each such station.

A most favorable antenna beam may be identified as the beam having the largest averaged RSSI as measured from associated ACK frames. Additional or alternative metrics may be used in identifying a most favorable antenna beam, such as signal to noise information, bit error rate, etcetera. However, the RSSI measurements utilized according to embodiments of the invention may be preferred in particular configurations for ease in implementation.

A beam switching table, such as may be stored in a memory associated with control logic 315 and/or network processor 350, is preferably updated with information associating an identified most favorable antenna beam with each station for which communication is to be provided by base station 110. The beam switching table may store additional information, such as a next most favorable antenna beam, an antenna beam associated with an alternate location for a station, etcetera, if desired.

The foregoing selection of most favorable antenna beam is preferably performed upon initialization of system 300 to build a beam switching table for use in providing communications according to the present invention. Additionally, the beam switching table may be updated from time to time, during network operation, to reflect addition or removal of stations, movement of stations, changes in link propagation conditions, etcetera. The periodicity of such updates may depend upon such factors as the mobility of the stations, the morphology of the coverage area, etcetera.

Operation of system 300 according to a preferred embodiment invokes scheduling of links using the appropriate antenna beams using protocols native to the stations, such as station 120, communicating with base station 110, thereby facilitating operation of this embodiment of the present invention without special adaptation to these stations. For example, station 120 may operate according to IEEE 802.11 communication protocols (and RF circuitry 320, baseband circuitry 330, media access control (MAC) circuitry 340, and network processor 350 of base station 110 may correspondingly operate according to IEEE 802.11 communication protocols), and control algorithms (e.g., operable upon control logic 315 and/or network processor 350) may use signaling native to IEEE 802.11 communication protocols to implement appropriate scheduling.

According to one exemplary embodiment, when base station 110 has downlink packets to transmit to a station, base station 110 can read a beam-switching table and select an appropriate beam for transmission. However, for uplink packets from stations to base station 110, predicting which station will obtain the channel presents challenges, particularly in a carrier sense/collision detection protocol such as that of the IEEE 802.11 communication protocols. Moreover, if base station 110 were to wait until downlink data is transmitted to a particular station to determine if that station has data for uplink communication, data may be queued an unacceptably long time at stations. Accordingly, embodiments of the present invention may operate to provide CTS scheduling to artificially create a time-division multi-access (TDMA) system by allocating a time slot for each station in the network in a time-division manner. For example, by referencing a beam-switching table, a particular antenna beam may selected for use for a particular station in a given time slot, thus giving each station a period for uplink communication.

Figure 5:
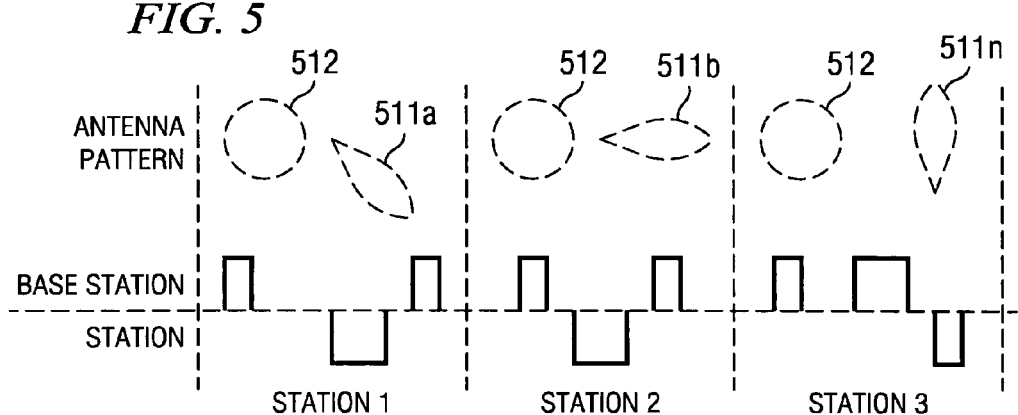
FIG. 5 shows operation of scheduling techniques of an embodiment of the present invention.

CTS scheduling as described above is illustrated in FIG. 5. In the embodiment illustrated in FIG. 5, base station 110 periodically sends a CTS frame to a particular scheduled station (e.g., station 1) using a global-mode antenna configuration (beam 512), preferably with an extra long duration to ensure all stations receive the CTS frame. The CTS frame may be sent at a low data rate, e.g., the lowest possible data rate, to facilitate all stations, even those on the periphery of the coverage area, receiving the CTS frame. The scheduled station (i.e., the station the CTS frame was addresses to) should ignore the CTS, while the rest of the stations preferably respond to the CTS frame by setting their NAV and keeping silent. Base station 110 of the illustrated embodiment then changes to the individual-mode and selects the best beam associated with the addressed station (e.g., beam 511a) by reading a beam-switching table. The selected station may then commence uplink transmission. Downlink transmission may also be provided to the selected station by base station 110 during the period in which the appropriate antenna beam is selected for that station.

The above steps are preferably repeated for other stations to give those stations an opportunity to communicate in the uplink. For example, after uplink communication has been completed (or a predetermined period of time, bandwidth, number of bits or frames, etcetera has been allocated) with respect to station 1, base station 110 again sends a CTS frame to a particular scheduled station (e.g., station 2) using a global-mode antenna configuration (beam 512). Base station 110 of the illustrated embodiment then changes to the individual-mode and selects the best beam associated with the addressed station (e.g., beam 511b) by reading a beam-switching table. The selected station may then commence uplink transmission. Thereafter, after uplink communication has been completed (or a predetermined period of time, bandwidth, number of bits or frames, etcetera has been allocated) with respect to station 2, base station 110 again sends a CTS frame to a particular scheduled station (e.g., station 3) using a global-mode antenna configuration (beam 512). Base station 110 of the illustrated embodiment then changes to the individual-mode and selects the best beam associated with the addressed station (e.g., beam 511n) by reading a beam-switching table. The selected station may then commence uplink transmission.

Base station 110 may terminate the pre-allocated time duration when no traffic from and/or to the station has been detected over a pre-defined time period. The termination can be interpreted as either no packet exchange between the base station and the station, or the uplink packet loss when the station has moved into another beam coverage area. Prior to sending a CTS frame to a next scheduled station, base station 110 may send a CF-End frame using the global antenna beam to announce medium clear. Such "medium clear" periods may be used by base station 110 to detect new stations and/or new positions with respect to previously served stations. For example, after transmitting a CF-End frame using global antenna beam 512, base station 110 may monitor signals received using global antenna beam 512 to detect signaling, such as RTS, from stations to identify a new or relocated station. Such signaling may be used to update a beam-switching table and/or to invoke updating a beam-switching table through selection of most favorable antenna beams as described above.

It should be appreciated that the foregoing techniques for establishing time division control using existing protocols is only exemplary of how a system adapted according to the present invention may operate. In IEEE 802.11 MAC mechanisms, CTS signals are but one example of control signals used to control sequential transmissions. Other signals that can establish transmission queuing and back-off times useful according to the present invention may also be used. For example, a point coordination function (PCF) or a hybrid coordination function (HCF) may be employed according to embodiments of the invention.

It is expected that some overhead will be introduced by beam searching to maintain the beam-switching table and transferring the scheduling information as described above. However, it is also expected that because communication protocols used by embodiments of the present invention, such as those set forth in the IEEE 802.11 standards, provide for decreased bit rates as link quality decreases, use of multi-beam antenna technology according to such embodiments is expected to provide improved link quality and, therefore, may provide a net increase in payload data capacity. Moreover, it should be appreciated that the embodiment of FIG. 3 primarily implements software and control changes at the base station (in addition to the antenna and feed matrix hardware alterations) and hence development and deployment times can be very short (and without alteration to the client stations). With each unicast payload transmission from the base station being performed on narrow beams, the interference to other systems (e.g., stations not in communication with this base station, other base stations, etcetera) is significantly reduced. Therefore, the foregoing embodiment provides an overall system capacity increase.

Figure 6:
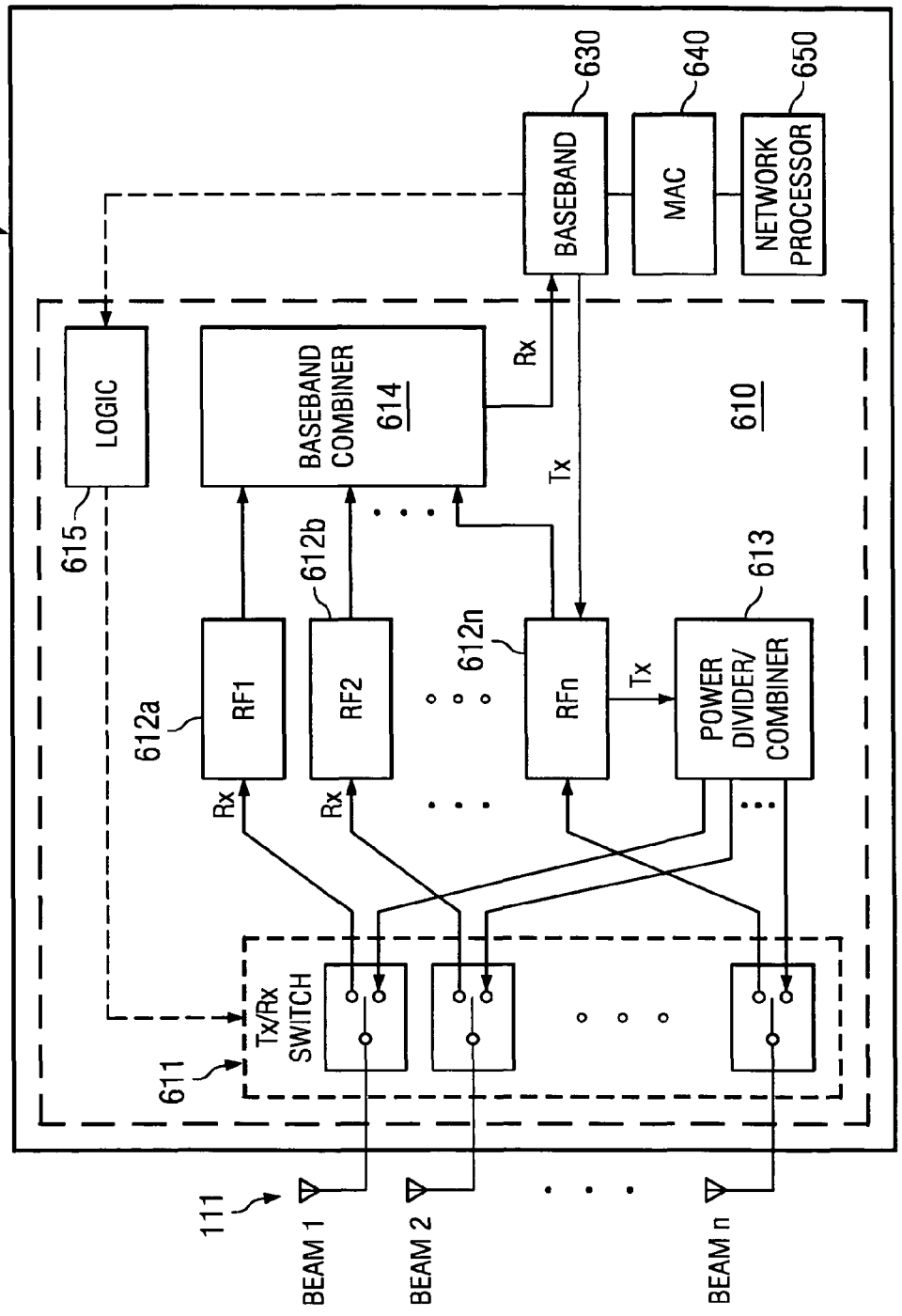
FIG. 6 shows a block diagram of a wireless network base station adapted according to an embodiment of the present invention.

Directing attention to FIG. 6, an embodiment employing diversity techniques for packet transmission and receiving using multi-beam antenna technology according to the present invention is shown as system 600. The illustrated embodiment of FIG. 6 utilizes baseband circuitry 630, MAC circuitry 640, and network processor 650 of a conventional access point architecture (although operating under control of algorithms adapted according to the present invention), such as that of an IEEE 802.11 compliant access point. However, antenna beam selection circuitry 610 of the present invention, comprising diplexer circuitry 611, RF front-ends 612a-612n, power divider 613, baseband combiner 614, and control logic 615 (configured substantially as described above with respect to control logic 315), is coupled to the foregoing access point circuitry to provide an interface to multi-beam antenna 111 operable according to concepts of the present invention.

The embodiment of FIG. 6 employs multiple RF front-ends and uses an extra baseband component to implement receive diversity. In operation according to a preferred embodiment, for transmission power divider 613 is coupled to the n beams via diplexer circuitry 611 to form a wide beam global antenna beam. For example, RF front-end 612n may be used for downlink frames and thus be coupled to power divider 613 for downlink transmission in a global-mode. Transmission power may be increased sufficiently by RF front-end 612n to provide communication of downlink frames throughout the extended coverage area. However, for uplink receiving, each of beams 1-n is preferably connected to a respective one of RF front-ends 612a-612n. The output signal streams from RF front-ends 612a-612n are preferably input to baseband combiner 614 for diversity combining. The combined result may then be passed to baseband circuitry 630, such as may comprise an IEEE 802.11 baseband chipset, for further processing.

Baseband combiner 614 of a preferred embodiment is implemented in hardware, such as may comprise a field programmable gate array (FPGA) and/or other digital and analog devices. According to preferred embodiments, baseband combiner 614 performs one or more diversity techniques with respect to the n copies of baseband analog signals. Such diversity techniques may comprise diversity selection and/or diversity combining.

The n antenna beams of preferred embodiments are pointing in different directions (whether in the azimuth or elevation). Accordingly, it is expected that one or a small subset of the n antenna beams would have a much stronger signal strength associated with a particular station than would the other antenna beams. Therefore, selection diversity may be a diversity technique that may be implemented to achieve a best tradeoff between performance and complexity according to embodiments of the invention. For example, the RSSI level for a signal of interest with respect to each antenna beam receive branch may be analyzed for selection of an antenna beam signal by baseband combiner 614 to provide to baseband circuitry 630. Of course, other diversity techniques may additionally or alternatively be implemented, such as maximum ratio combining, equal gain combining, etcetera.

Figure 7:
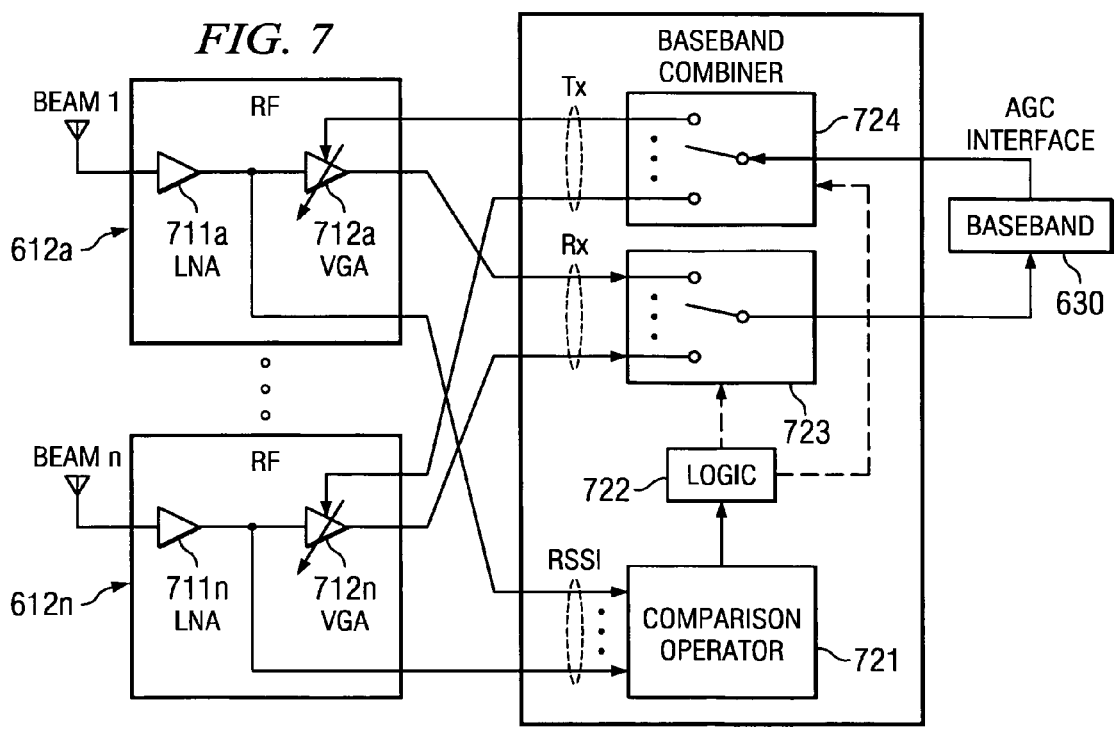
FIG. 7 shows detail with respect to an embodiment of various blocks of the wireless network base station of FIG. 6.

FIG. 7 shows detail with respect to one embodiment implementing baseband combiner 614 adapted to provide selection diversity. In the embodiment of FIG. 7, RF front-ends 612a-612n comprise a low-noise amplifier (LNA) (LNAs 711a-711n) and a variable gain amplifier (VGA) (VGAs 712a-712n). RSSI information measured from the output of the LNAs is input to comparison operator 721. The antenna beam signal with the largest RSSI value will be selected and used to control receive signal link switch 723 and AGC interface switch 724 according to one embodiment.

It should be appreciated that implementation of diversity selection as discussed above with respect to the embodiment of FIG. 7 provides a relatively simple scheme to implement selection diversity on the receiver side. Moreover, the receive diversity configurations discussed above with respect to system 600 are done in the baseband analog domain, and therefore are transparent to physical (PHY) and upper network layers. Such techniques may be implemented without altering existing protocols, such as IEEE 802.11 communication protocols. Moreover, embodiments as described with respect to system 600 provide an extended coverage area using multi-beam technology without introducing overhead into the network throughput.

Figure 8:
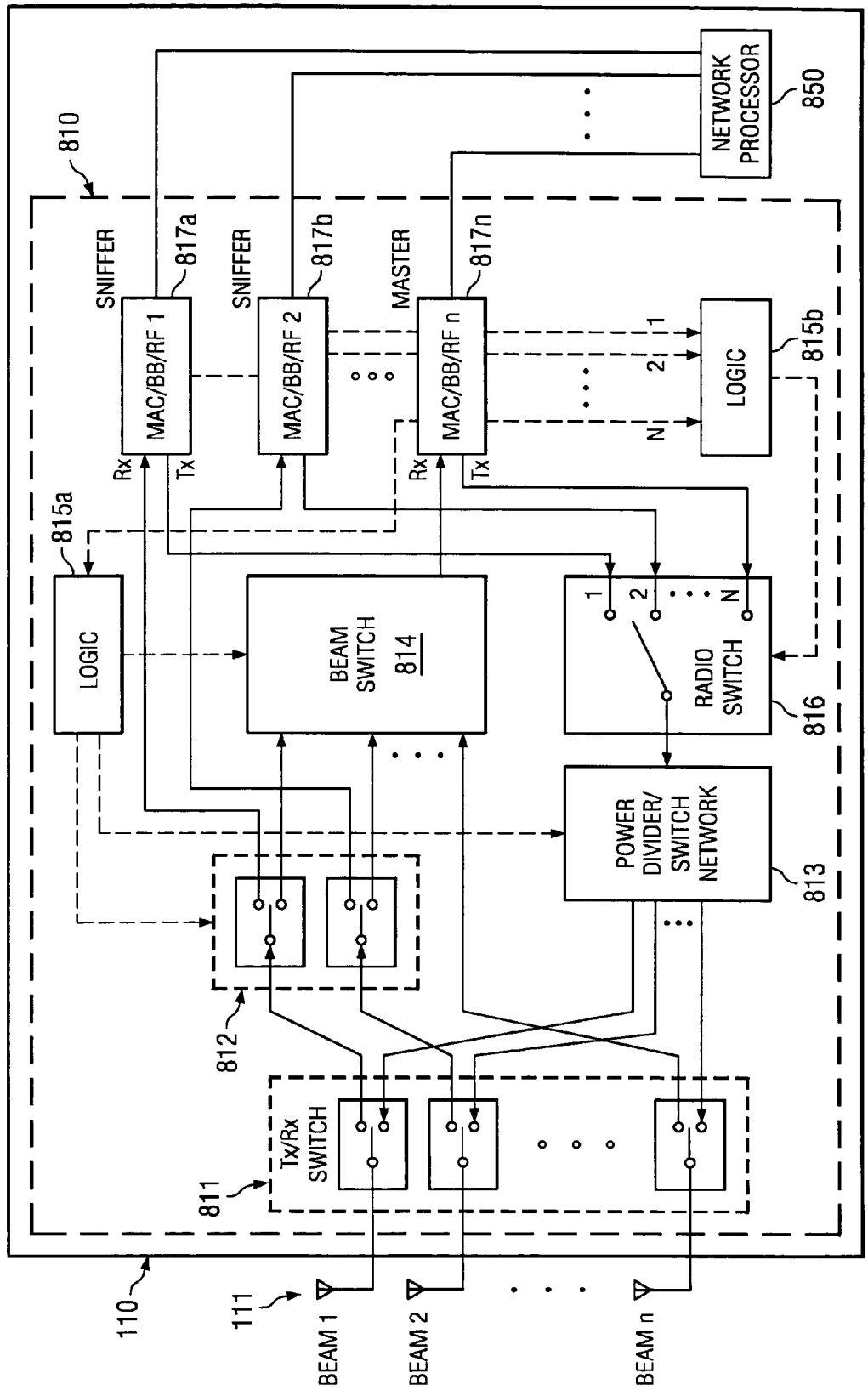
FIG. 8 shows a block diagram of a wireless network base station adapted according to an embodiment of the present invention.

Directing attention to FIG. 8, another embodiment employing diversity techniques for packet transmission and receiving using multi-beam antenna technology according to the present invention is shown as system 800. The illustrated embodiment of FIG. 8 utilizes network processor 850 of a conventional access point architecture (although operating under control of algorithms adapted according to the present invention), such as that of an IEEE 802.11 compliant access point. However, antenna beam selection circuitry 810 of the present invention, comprising diplexer circuitry 811, front-end switch 812, power divider/switch network 813, beam switch 814, control logic 615a and 615b (configured substantially as described above with respect to control logic 315), and radios 817a-817n is coupled to the foregoing access point circuitry to provide an interface to multi-beam antenna 111 operable according to concepts of the present invention. The embodiment of FIG. 8 is preferably operated to provide a single transmit radio (e.g., master radio 817n) and multiple receive radios (e.g., sniffer radios 817a-817n-1). Accordingly, diversity techniques utilized with respect to system 800 may readily operate with respect to decoded and/or demodulated signals, such as to make antenna beam selections based upon data error rates, retries, etcetera.

Radios 817a-817n of embodiments of the invention each comprise MAC, baseband, and RF circuitry. The n radios preferably operate at the same frequency channel and have the same MAC address and are coordinated, such as by algorithms operable upon network processor 850 and/or control logic 815a and 815b, to act as one radio for transmission while as N radios for receiving. Although operating multiple radios, system 800 of preferred embodiments appears to stations in communication with base station 110 as a single base station operable with a single radio.

For general receiving, e.g., monitoring for RTS or other signaling to invoke a communication session from a station, each antenna beam 1-n is coupled to a corresponding one of radios 817a-817n, via front-end switch 812 for radios 817a-817n-1 and via beam switch 814 for radio 817n. Accordingly, each of radios 817a-817n may operate individually in a receive mode. Data demodulated by each of radios 817a-817n may be provided to network processor 850 for further processing. When the same data frame is received from two or more radios, network processor 850 of a preferred embodiment operates to select a best data stream, such as that associated with the largest RSSI and/or least error.

For transmission, the antenna beams may be used together, through power divider/switch network 813, to form a wide-beam global antenna beam or may be selected individually through power divider/switch network 813. According to a preferred embodiment, all downlink payload frames are transmitted by a master radio, shown in FIG. 8 as radio 817n. The n−1 sniffer radios of the illustrated embodiment, shown here as radios 817a-817n-1, preferably only transmit particular frames, such as ACK/CTS frames as an immediate response to a received data or RTS frames.

Radio switch 816 of one embodiment provides switching to prevent the simultaneous transmission of duplicate frames, such as ACK/CTS frames, from more than one of radios 817a-817n. Operating under control of logic 815b, radio switch 816 of the illustrated embodiment prevents duplicate frames from being transmitted in the air medium and, when one radio is transmitting payload data, suspends transmissions by the other radios.

Figure 9:
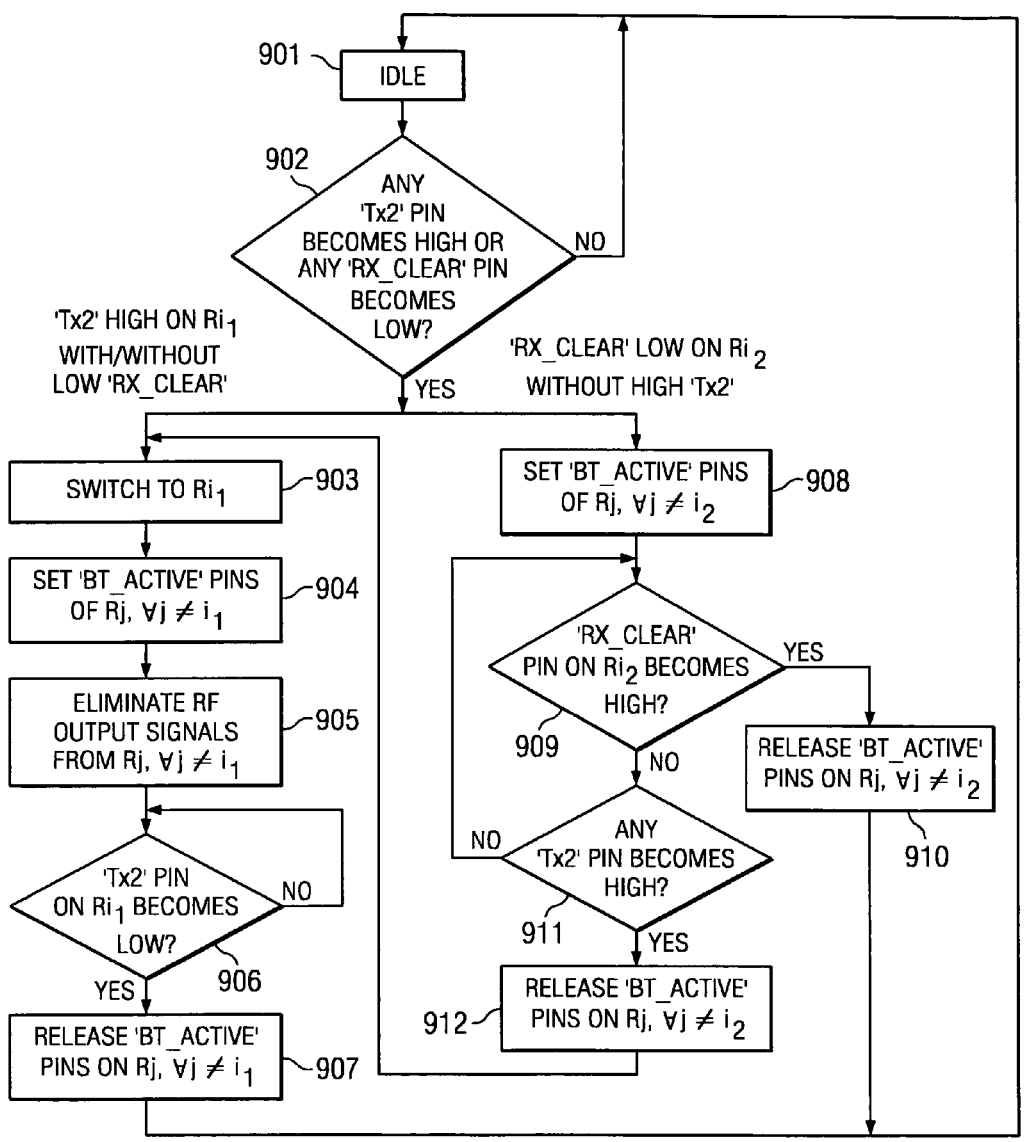
FIG. 9 shows a flow diagram of operation of an embodiment of a radio switch of the wireless network base station of FIG. 8.

FIG. 9 illustrates operation of radio switch 816, under control of control logic 815b, according to an embodiment of the invention. In the embodiment of FIG. 9, the output of a "T×2" pin of each of radios 817a-817n is utilized to indicate when the associated radio is transmitting a frame. For example, a radio's T×2 pin may provide a high signal when transmitting and a low signal when not transmitting. The output of a "RX_CLEAR" pin of each of radios 817a-817n is utilized in the embodiment of FIG. 9 to indicate the clear channel assessment (CCA) provided by an associated radio. A radio's RX_CLEAR pin may provide a high signal when the CCA indicates the channel is not active and low when the CCA indicates the channel is active. For example, RX_CLEAR for a particular radio may be low when the radio is receiving a packet, when the radio is transmitting a packet, or when the energy on the medium is greater than a pre-determined value, e.g., −62 dBm. In the embodiment of FIG. 9, "BT_ACTIVE" represents an input pin for each of radios 817a-817n to prevent an associated radio from transmitting a new packet. A BT_ACTIVE signal utilized according to embodiments of the invention is similar to external carrier sensing. The BT_ACTIVE signal may be taken high with respect to a particular radio when that radio is to be prevented from transmitting.

At block 901, radio switch 816 is maintained in an idle state. In the idle state of block 901, control logic 815b monitors the T×2 pins and the RX_CLEAR pins of radios 817a-817n. At block 902, if it is determined that no T×2 pins have become high and no RX_CLEAR pins have become low, processing returns to block 901. However, if it is determined that any T×2 pin has become high or that any RX_CLEAR pin has become low, processing proceeds to a branch. In the branch leading to block 903, a radio (represented as the $(i_1)$th radio $(Ri_1)$) has been determined to have a high T×2 signal, regardless of the status of the signal associated with the RX_CLEAR pins. In the branch leading to block 908, a radio (represented as the $(i_2)$th radio $(Ri_2)$) has been determined to have a low RX_CLEAR signal, with no radio having a high T×2 signal.

If, at block 902, it is determined that any T×2 pin has become high, processing proceeds to block 903. At block 903, radio switch 816 is controlled by control logic 815b to connect the radio with its associated T×2 signal high (radio $Ri_1$) to power divider/switch network 813. If two or more T×2 pins have become high substantially simultaneously (e.g., the offset is small enough that control logic 815b cannot distinguish), one of the radios having a high T×2 pin will be selected (e.g., selected as radio $Ri_1$), such as arbitrarily. Control logic 815b sets the BT_ACTIVE signal of all the other radios (radios Rj) to indicate that the medium is busy (block 904) and eliminates the RF output signals of each of these other radios (block 905), such as by connecting the radio outputs with a matched load. The selected radio (radio $Ri_1$) will preferably provide data communication until queued data packets for an associated station are communicated, for an allowed period of time, and/or the like. Accordingly, control logic 815b will preferably keep checking the T×2 signal on the selected radio (radio $Ri_1$) at block 906. If it is determined that the T×2 signal has become low, processing proceeds to block 907 where control logic 815b releases the BT_ACTIVE signal of the remaining radios (radios Rj). Thereafter processing returns to the idle state (block 901).

If, at block 902, it is determined that no T×2 pin has become high but that any RX_CLEAR pin has become low, processing proceeds to block 908. At block 908, control logic 815b sets the BT_ACTIVE signal of all the radios (radios Rj) other than the radio $(Ri_2)$ for which the RX_CLEAR pin was detected to be low. If two or more RX_CLEAR pins have become low substantially simultaneously (e.g., the offset is small enough that control logic 815b cannot distinguish) one of the radios having the RX_CLEAR signal low will be selected (e.g., selected as radio $Ri_2$), such as arbitrarily. Thereafter, control logic 815b monitors the RX_CLEAR signal of radio $Ri_2$ and the T×2 signal of all the radios. If it is determined at block 909 that the RX_CLEAR signal of radio $Ri_2$ has become high, processing proceeds to block 910 wherein the BT_ACTIVE signal for radios Rj is released and processing returns to block 901. However, if it is determined at block 909 that the RX_CLEAR signal of radio $Ri_2$ has not become high, control logic 815b will determine if any Tx2 signal has become high (block 911). If at block 911 it is determined that no Tx2 signal has become high, processing returns to block 909. However, if at block 911 it is determined that a Tx2 signal has become high, processing proceeds to block 912 wherein the BT_ACTIVE active signal for radios Rj is released and processing proceeds to block 903. Accordingly, if any Tx2 signal, for example on radio $Ri_1$, becomes high when $Ri_2$ still has a low RX_CLEAR associated therewith, the control logic for radio switch 816 of the illustrated embodiment will proceed to the flow associated with blocks 903-907 discussed above to facilitate data communication by the radio having a high Tx2 signal associated therewith. It should be appreciated that, in the above described flow diagram, radios $Ri_1$ and $Ri_2$ may be the same radio or may be different radios.

When a selected radio (e.g., radio $Ri_1$ selected above from radios 817a-817n) is coupled by radio switch 816 to power divider/switch network 813, the radio's signal may be transmitted in each of antenna beams 1-n (global-mode) as provided by a power divider aspect of power divider/switch network 813. Alternatively, a subset of antenna beams 1-n, such as a most favorable one of antenna beams 1-n, may be used for such data communication using a switch network aspect of power divider/switch network 813.

Having described the operation of radio switch 816 in the transmit signal path of base station 110 above, beam switch 814 in the receive signal path of base station 110 will be described. Beam switch 814 of preferred embodiments couples antenna beam n to radio 817n by default, such as when radio 817n is idle. However, when radio 817n (the master radio in the illustrated embodiment) has a unicast downlink frame (e.g., a payload frame directed to a particular station) to transmit, a specific antenna beam will preferably be selected and coupled to radio 817n by beam switch 814, via front-end switch 812. For example, an antenna beam to be coupled to radio 817n may be selected according to the station address for which communications are then being provided. According to one embodiment, the selection of an antenna beam coupled to radio 817n by beam switch 814 is based on a beam-switching table, such as may be maintained in software of network processor 850 and/or control logic 815a.

In operation according to a preferred embodiment, when a downlink frame is transmitted on the wide-beam global antenna beam by radio 817n, an antenna beam selected to correspond to the location of the station for which the downlink frame was directed is used for receiving the immediate response from the station, e.g. ACK/CTS frames. During this time, the sniffer radio (the corresponding one of radios 817a-817n-1) originally associated with the selected antenna beam, if any, is preferably disconnected and receives no signal during this time. According to embodiments of the invention, during a carrier-sense and backoff procedure prior to payload transmission, beam switch 814 connects radio 817n with antenna beam n.

Figure 10:
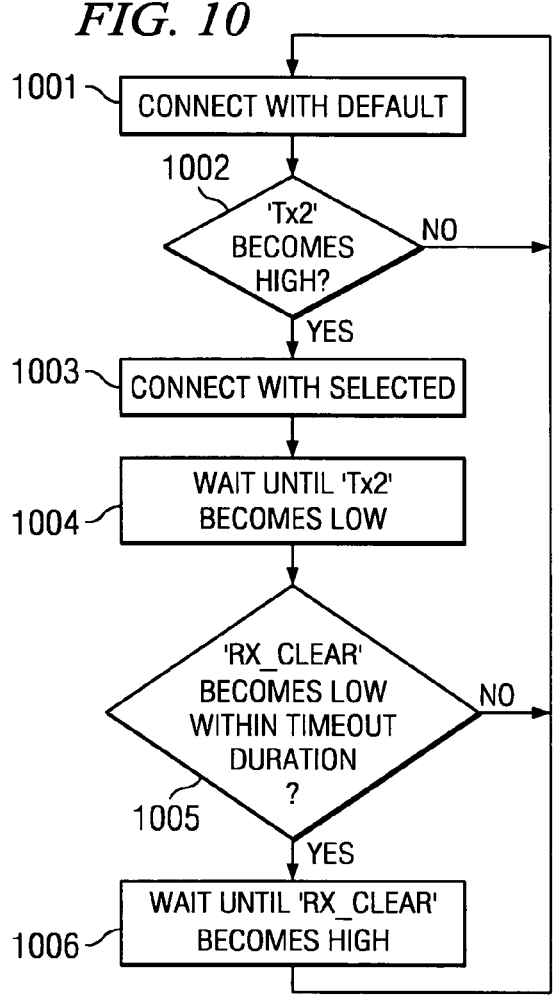
FIG. 10 shows a flow diagram of operation of an embodiment of a beam switch of the wireless network base station of FIG. 8.

FIG. 10 illustrates operation of beam switch 814, under control of control logic 815a, according to an embodiment of the invention. As discussed above with respect to FIG. 9, "Tx2" is a signal provided by a pin of a respective one of radios 817a-817n to indicate the radio is transmitting a frame, and "RX_CLEAR" is a signal provided by a pin of a respective one of radios 817a-817n to indicate medium clear. "Timeout" as used with respect to the flow diagram of FIG. 10 refers to the amount of time to wait for ACK/CTS signal before issuing a timeout.

At block 1001 of FIG. 10 control logic 815a controls beam switch 814 to couple the antenna beams in a default configuration. For example, a preferred embodiment default configuration couples antenna beam n to radio 817n. It should be appreciated that during this default configuration provided by beam switch 814, front-end switch 812 may couple each of antenna beams 1 through n−1 to respective ones of radios 817a-817n-1 rather than beam switch 814. At block 1002 control logic 815a determines whether the Tx2 signal of radio 817n has become high, potentially indicating a unicast transmission by master radio 817n. If the Tx2 signal of radio 817n has not become high, processing returns to block 1001. However, if the Tx2 signal associated with radio 817n has become high processing proceeds to block 1003. At block 1003 beam switch 814 and front-end switch 812 are controlled by control logic 815a to couple a selected antenna beam of antenna beams 1-n to radio 817n. For example, a beam-switching table may be utilized to determine an antenna beam of antenna beams 1-n most favorable for communication with the particular station for which a unicast payload frame is being transmitted by radio 817n. At block 1004, control logic 815a waits until the Tx2 signal of radio 817n again becomes low, indicating the communications by radio 817n have been concluded. At block 1005 a determination is made by control logic 815a as to whether the RX_CLEAR signal associated with radio 817n has become low within a timeout duration. If the RX_CLEAR signal associated with radio 817n has not become low within the timeout duration processing proceeds to block 1001. However, is the RX_CLEAR signal associated with radio 817n has become low within the timeout duration processing proceeds to block 1006. At block 1006, control logic 815a waits until the RX_CLEAR signal associated with radio 817n becomes high again before proceeding to block 1001.

As discussed above, a beam-switching table may be utilized by embodiments of system 800. Such a beam-switching table may comprise a database accessible to network processor 850 and/or control logic 815a and 815b. Moreover, software of network processor 850 and/or control logic 815a and 815b may operate to create and update such a beam-switching table.

A beam-switching table utilized according to one embodiment of system 800 keeps selected antenna beam information for each associated station at base station 110. Such selected antenna beam information may comprise the most favorable antenna beam for each station, as described above with respect to system 300. However, additional metrics may be readily utilized by system 800 in determining a most favorable antenna beam. Specifically, because each antenna beam 1-n of system 800 has a corresponding radio of radios 817a-817n associated therewith, a most favorable antenna beam may be identified by comparing the statistics of RSSI and error status of all beams.

Initially, a beam-switching table can be built automatically for new clients according to their probe request and/or association request. For example, the best antenna beam for each new client could be assigned as the antenna beam connected to the radio receiving that request frame and having the strongest RSSI level and/or least error. During network operations, network processor 850 and/or control logic 815a and 815b can update the beam-switching table for a specific client making use of the uplink traffic. When a station moves from one area to an area covered by a different antenna beam, the RSSI obtained from the previous best beam will likely be weaker than that from the new beam. The antenna beam information in the beam-switching table associated with this station may, accordingly, be updated to this new antenna beam. It should be appreciated that the multiple radios of the configuration of system 800 facilitate such a passive beam-switching table update, and therefore do not introduce any overhead to the network throughput.

System 800 of embodiments of the present invention may additionally or alternatively update a beam-switching table for a station or stations actively, without waiting for uplink frames from the station. For example, a simple scheme for providing active beam-switching table updates according to an embodiment of the invention is to send multiple null frames using each beam pattern and waits for their responses, similar to the technique described above with respect to system 300. Here the most favorable antenna beam may be selected as that antenna beam having the largest averaged RSSI measured from ACK frames.

It should be appreciated that implementation of the multiple radio configuration of the embodiment of FIG. 8 facilitates avoidance of uplink collision between hidden nodes because different radios, coupled to antenna beams pointing to different directions, can receive packets individually. Moreover, using the beam selection architecture of the illustrated embodiment unicast payload frames transmitted from the base station have the option to be transmitted on the appropriate narrow beam, thereby reducing the interface to other stations, base stations, etcetera.

The embodiments above have each been described with reference to global-mode transmission, or transmission where all or a plurality of the n antenna beams, are used to simultaneously transmit a particular signal. It should be appreciated that when providing a same signal to multiple antenna beam interfaces of a multi-beam antenna feed matrix undesired nulls (undesired destructive combining of the antenna beam signals) may be experienced such that a composite radiation pattern does not closely approximate the sum of the individual antenna beam patterns. In order to avoid or mitigate such nulls, embodiments of the present invention implement null avoidance techniques when simultaneously transmitting a signal over multiple antenna beams (e.g., global-mode transmission). For example, a preferred embodiment operates to remove or avoid the aforementioned nulls by adding random phase offset between each antenna beam port of a feed matrix.

Figure 11:
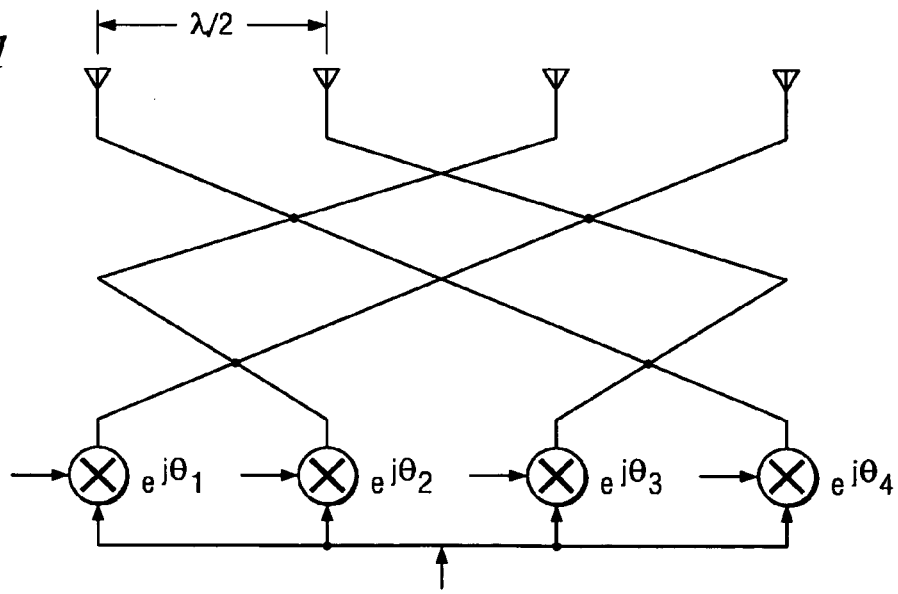
FIG. 11 shows implementation of random phase offset for simultaneous transmission on multiple antenna beams according to an embodiment of the present invention.

Directing attention to FIG. 11, an embodiment wherein random phase offset is introduced between each antenna beam port of an exemplary 4-port Butler matrix antenna feed network is shown. The random phases $\theta_1$, $\theta_2$, $\theta_3$, and $\theta_4$ are added at each port of the Butler matrix by mixing the signal to be transmitted with a corresponding phase offset signal. Adding the phase offset can be done in baseband or RF domains as well as the digital or analog domains. According to preferred embodiments of the invention, the random phases are independent and can be uniformly distributed within 0 to $2\pi$. For example, the random phase offset values can be uniformly distributed within 0°-360°. Additionally or alternatively, the random phase offset values may be randomly selected from some fixed discrete values, such as 0°, 90°, 180°, and 270°.

The randomness with respect to phases $\theta_1$, $\theta_2$, $\theta_3$, and $\theta_4$ is preferably from packet to packet. Accordingly, within each packet transmission the phases $\theta_1$, $\theta_2$, $\theta_3$, and $\theta_4$ are constant according to preferred embodiments. The application of such random phase offsets results in a time averaged antenna beam pattern which is substantially free of undesired nulls and, therefore, more closely approaches the sum of the individual antenna beam radiation patterns.

Figure 12:
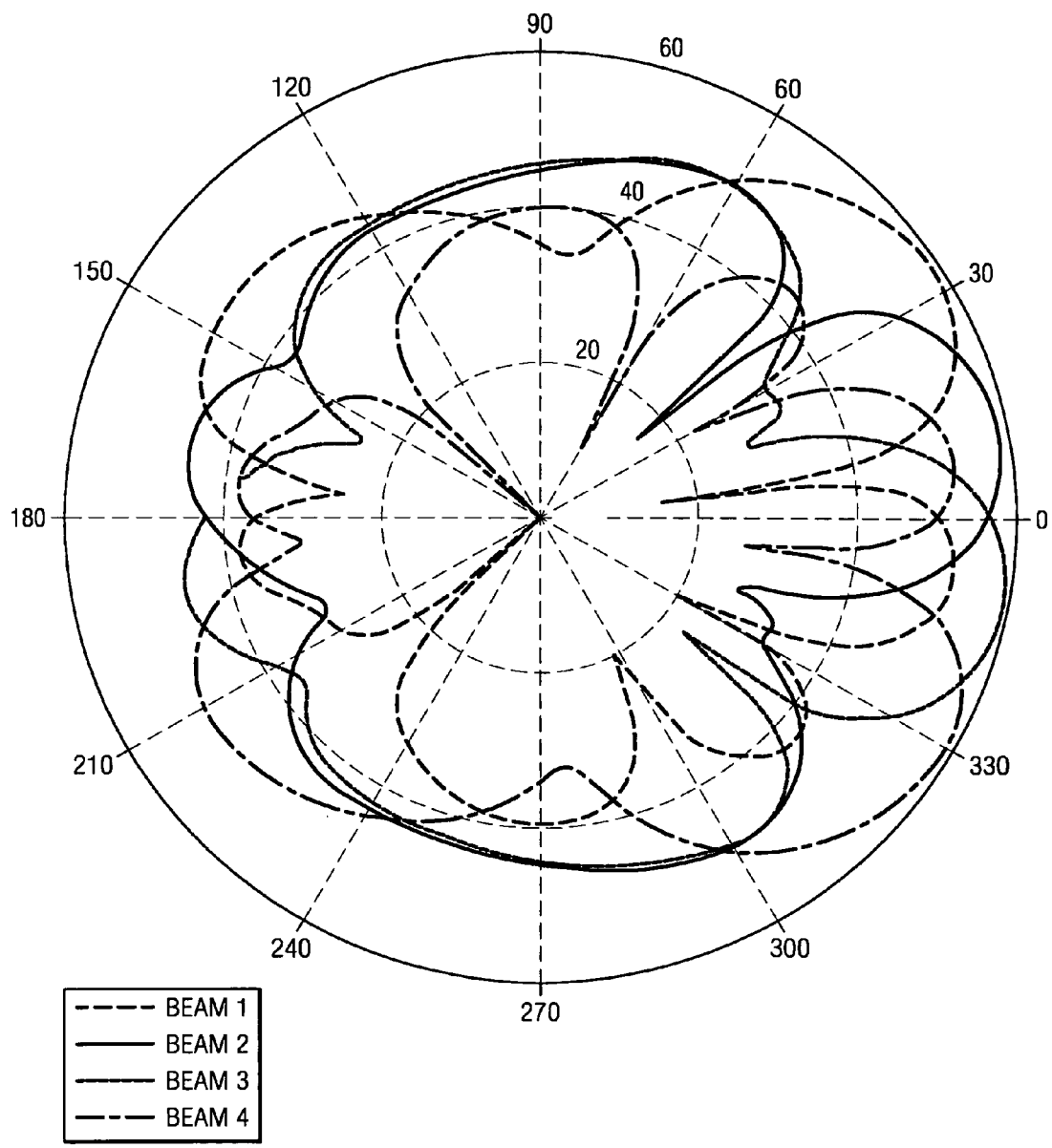
FIGS. 12 and 13 show radiation patterns associated with the circuitry of FIG. 11.
Figure 13:
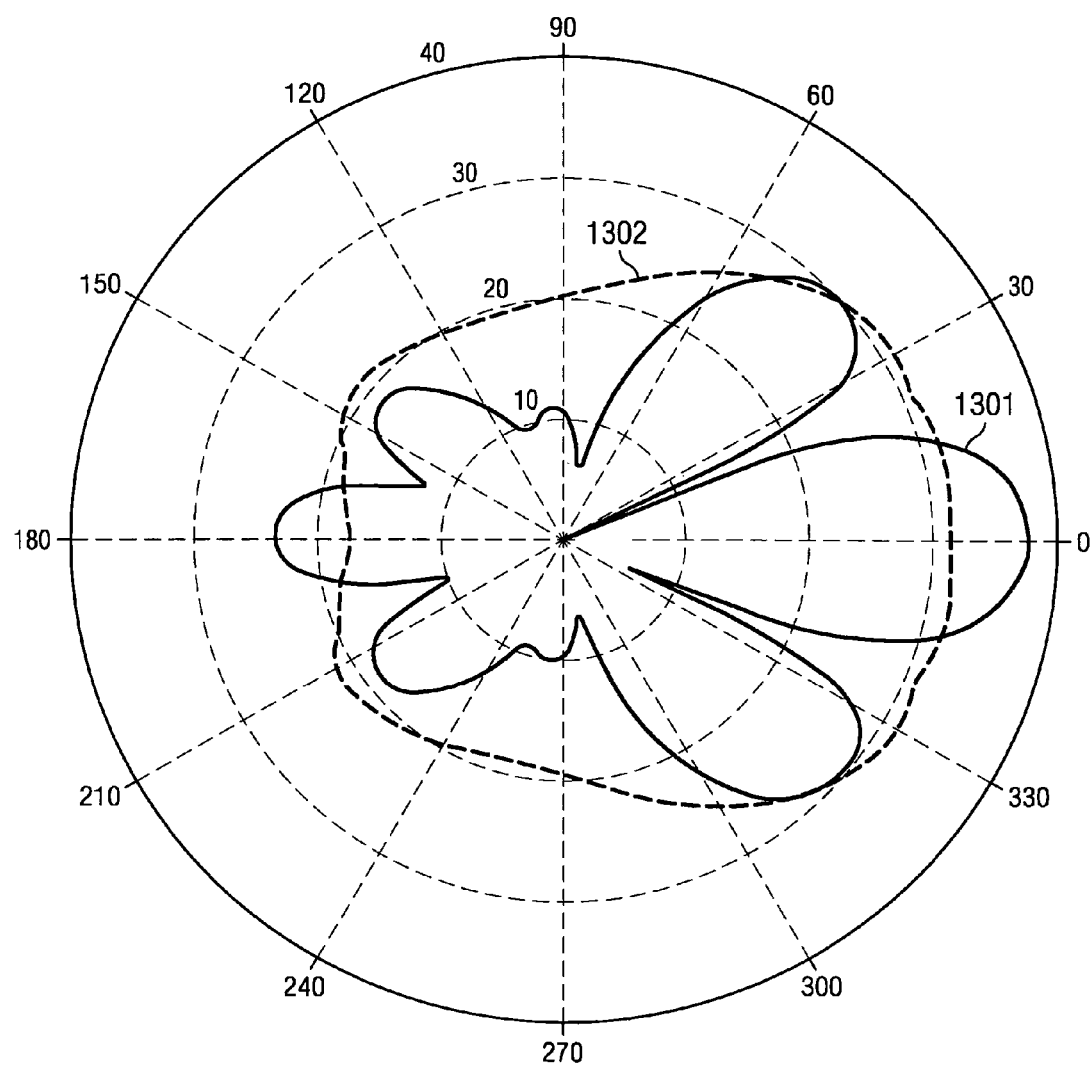

The individual antenna beam radiation patterns of the Butler matrix of FIG. 11 are shown in FIG. 12. Each beam has approximately a 3 dB beamwidth of about 20 degrees. The resulting radiation pattern when all 4 antenna beam ports are provided a same signal without any phase offset, i.e. $\theta_1=\theta_2=\theta_3=\theta_4=0$, is shown in FIG. 13 as radiation pattern 1301. It can be seen that there are two very large undesired nulls at the side of the resulting main lobe which significantly reduce the overall beamwidth. However, the average radiation pattern after adding random phase offset with value taken from {0°, 90°, 180°, 270°} provides a much wider 3 dB beamwidth, shown as radiation pattern 1302 having approximately a 90 degree beamwidth.

It should be appreciated that, for each random offset realization, the overall pattern may include some undesired nulls. However, in long-term time average, the antenna gain is quite uniform within a very wide angle region. From station's perspective operating within the coverage area, the effect of these random nulls is equivalent to artificially introducing random channel fading.

Adding random phase offsets according to embodiments of the present invention may be utilized to overcome undesired nulls statistically, and thereby provide improvement the antenna coverage area. Moreover, random phase offset techniques of the present invention may be implemented without costly and expensive calibration of cable lines utilized in RF signal transmission.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A wireless local area network access point comprising:
a multi-beam antenna system providing multiple antenna beams; and
signal transmission path circuitry simultaneously coupling a same downlink signal to each said antenna beam of said multi-beam antenna system.

2. The wireless local area network access point of claim 1, wherein said multi-beam antenna system provides multiple narrow antenna beams.

3. The wireless local area network access point of claim 1, wherein said multi-beam antenna system provides multiple sector antenna beams.

4. The wireless local area network access point of claim 1, wherein said signal transmission path circuitry comprises a power divider.

5. The wireless local area network access point of claim 1, further comprising:
control logic, said control logic coupled to said signal transmission path circuitry to controllably couple said same downlink signal to each said antenna beam and another downlink signal to a selected one of said antenna beams.

6. The wireless local area network access point of claim 5, wherein said another downlink signal comprises a beacon message.

7. The wireless local area network access point of claim 5, wherein said another downlink signal comprises a polling message.

8. The wireless local area network access point of claim 5, wherein said another downlink signal comprises a contention-free end message.

9. The wireless local area network access point of claim 5, wherein said same downlink signal comprises a control signal and said another downlink signal comprises payload data.

10. The wireless local area network access point of claim 9, wherein said control signal comprises a contention-free end message.

11. The wireless local area network access point of claim 9, wherein said control signal comprises a clear to send message.

12. The wireless local area network access point of claim 9, wherein said control signal comprises an acknowledgement message.

13. The wireless local area network access point of claim 5, further comprising:
a beam-switching table, said control logic using information from said beam-switching table in selecting said selected one of said antenna beams.

14. The wireless local area network access point of claim 13, wherein said beam-switching table stores information with respect to a most favorable antenna beam of said antenna beams for use with respect to each of a plurality of stations.

15. The wireless local area network access point of claim 1, further comprising:
signal receive path circuitry independently coupling signals from each of said antenna beam to receive circuitry.

16. The wireless local area network access point of claim 15, further comprising:
control logic, said control logic coupled to said signal receive path circuitry to controllably couple a selected one of said antenna beam signals to said receive circuitry.

17. The wireless local area network access point of claim 15, wherein said signal receive path circuitry comprises:
radio frequency front-end circuitry associated with each antenna beam of said antenna beams.

18. The wireless local area network access point of claim 15, wherein said signal receive path circuitry comprises:
a radio associated with each antenna beam of said antenna beams.

19. The wireless local area network access point of claim 1, further comprising:
a baseband combiner disposed in a signal receive path and providing receive diversity with respect to said antenna beam signals.

20. The wireless local area network access point of claim 19, wherein said baseband combiner provides selection diversity.

21. The wireless local area network access point of claim 1, wherein said signal transmission path circuitry comprises:
phase offset circuitry introducing a phase offset between said same signal as provided to each antenna beam of said multi-beam antenna system.

22. The wireless local area network access point of claim 21, wherein said phase offset comprises a uniformly distributed phase offset between said antenna beams.

23. The wireless local area network access point of claim 21, wherein said phase offset is random from data packet to data packet and is constant during data packet transmission.

24. A method for extending a coverage area of a wireless local area network access point, said method comprising:
coupling a multi-beam antenna system providing multiple antenna beams to said wireless local area network access point; and
controlling said wireless local area network access point to simultaneously transmit a same downlink signal through each said antenna beam of said multi-beam antenna system.

25. The method of claim 24, further comprising:
introducing a phase offset with respect to said same downlink signal as transmitted through each of said antenna beams.

26. The method of claim 25, wherein said phase offset is random.

27. The method of claim 25, wherein said phase offset provides a time average radiation pattern free of undesired nulls.

28. The method of claim 24, wherein said same downlink signal transmitted through each said antenna beam comprises a contention-free end message.

29. The method of claim 24, further comprising:
selecting an individual antenna beam of said antenna beams for use in communicating with a particular station.

30. The method of claim 29, wherein said same downlink signal transmitted through each said antenna beam is addressed to said particular station.

31. The method of claim 30, wherein said same downlink signal comprises a clear to send message.

32. The method of claim 29, wherein said selecting an individual antenna beam comprises:
referencing a beam-switching table, said beam-switching table containing information with respect to a most favorable antenna beam for use with a plurality of stations communicating with said wireless local area network access point.

33. The method of claim 32, further comprising:
determining said most favorable antenna beam information contained within said beam-switching table passively during network communications.

34. The method of claim 32, further comprising:
determining said most favorable antenna beam information contained within said beam-switching table actively.

35. The method of claim 34, wherein said determining said most favorable antenna beam information comprises:
communicating null packets through each antenna beam of said multi-beam antenna system.

36. The method of claim 24, further comprising:
selecting an individual antenna beam of said antenna beams for use in communicating with a station after controlling said wireless local area network access point to simultaneously transmit said same downlink signal through each said antenna beam of said multi-beam antenna system.

37. The method of claim 36, further comprising:
transmitting a payload data packet to said station through said individual antenna beam.

38. The method of claim 36, further comprising:
receiving a payload data packet from said station through said individual antenna beam.

39. The method of claim 36, further comprising:
transmitting a beacon message through said individual antenna beam.

40. The method of claim 36 further comprising:
transmitting a polling message through said individual antenna beam.

41. The method of claim 36 further comprising:
transmitting a contention-free end message through said individual antenna beam.

42. The method of claim 24, wherein stations in communication with said wireless local area network access point operate according to a native communication protocol.

43. The method of claim 42, wherein said native communication protocol comprises an IEEE 802.11 communication protocol.

44. The method of claim 42, further comprising:
implementing a time division multiple access scheme using signaling available in said native communication protocol.

45. The method of claim 44, wherein said signaling comprises clear to send messages.

46. The method of claim 24, further comprising:
implementing receive diversity with respect to said antenna beams of said multi-beam antenna system.

47. The method of claim 46, wherein said receive diversity comprises selection diversity.

48. A base station system for providing high speed data communication, said system comprising:
a multi-beam antenna system providing multiple antenna beams;
independent radio frequency front-end circuitry for each said antenna beam providing diversity reception with respect to signals received through said antenna beams; and
a radio frequency front-end circuit providing a same transmit signal to a plurality of said antenna beams for transmission.

49. The system of claim 48, further comprising:
a baseband combiner coupled to each front-end circuit of said independent radio frequency front-end circuitry.

50. The system of claim 49, wherein said baseband combiner provides selection diversity with respect to said signals received through said antenna beams.

51. The system of claim 48, wherein said front-end circuitry of said independent radio frequency front-end circuitry each comprise a part of an corresponding independent radio.

52. The system of claim 48, further comprising:
a power divider coupled to said radio frequency front-end circuitry providing said same transmit signal to said plurality of antenna beams.

53. A system for mitigating nulls when transmitting a signal using a multi-beam antenna system, said system comprising:
phase offset circuitry coupled to a plurality of antenna beam interfaces and introducing a different phase offset with respect to each antenna beam of said plurality of antenna beams, said plurality of antenna beam interfaces being associated with multiple antenna beams of said multi-beam antenna system in which said signal is simultaneously transmitted.

54. The system of claim 53, further comprising:
control logic coupled to said phase offset circuitry and providing control signals to said phase offset circuitry to randomize said different phase offsets between data packets of said signal.

55. The system of claim 54, wherein said different phase offsets are constant during transmission of said data packets.

56. The system of claim 53, wherein said phase offset circuitry comprises:
a mixer associated with each antenna beam of said plurality of antenna beams to mix said signal with phase offset signals.

57. The system of claim 53, wherein said system is part of a wireless local area network access point.

58. The system of claim 53, wherein said system is part of a personal handy-phone system base station.

59. A method for mitigating nulls when transmitting a signal using a multi-beam antenna system, said method comprising:
providing a same signal for coupling to a plurality of antenna beam interfaces, said plurality of antenna beam interfaces each being associated with a corresponding antenna beam of said multi-beam antenna system used in synthesizing a composite radiation pattern;
introducing a different phase offset with respect to said signal as provided to each antenna beam interface; and
simultaneously radiating said signal having said different phase offsets in said antenna beams to synthesize said composite radiation pattern.

60. The method of claim 59, wherein said phase offset introduced with respect to each antenna beam interface is randomized between data packets of said signal.

61. The method of claim 60, wherein said phase offset introduced with respect to each antenna beam interface is constant during said data packets.

62. The method of claim 59, wherein said different phase offset is uniformly distributed as between said antenna beam interfaces.

63. The method of claim 59, wherein said different phase offset is randomly distributed as between said antenna beam interfaces.

64. The method of claim 59, wherein said introducing said phase offset provides a time average radiation pattern free of undesired nulls.

65. The method of claim 59, wherein said method is implemented with respect to a wireless local area network access point.

66. The method of claim 59, wherein said method is implemented with respect to a personal handy-phone system base station.

* * * * *